UNITED STATES PATENT OFFICE.

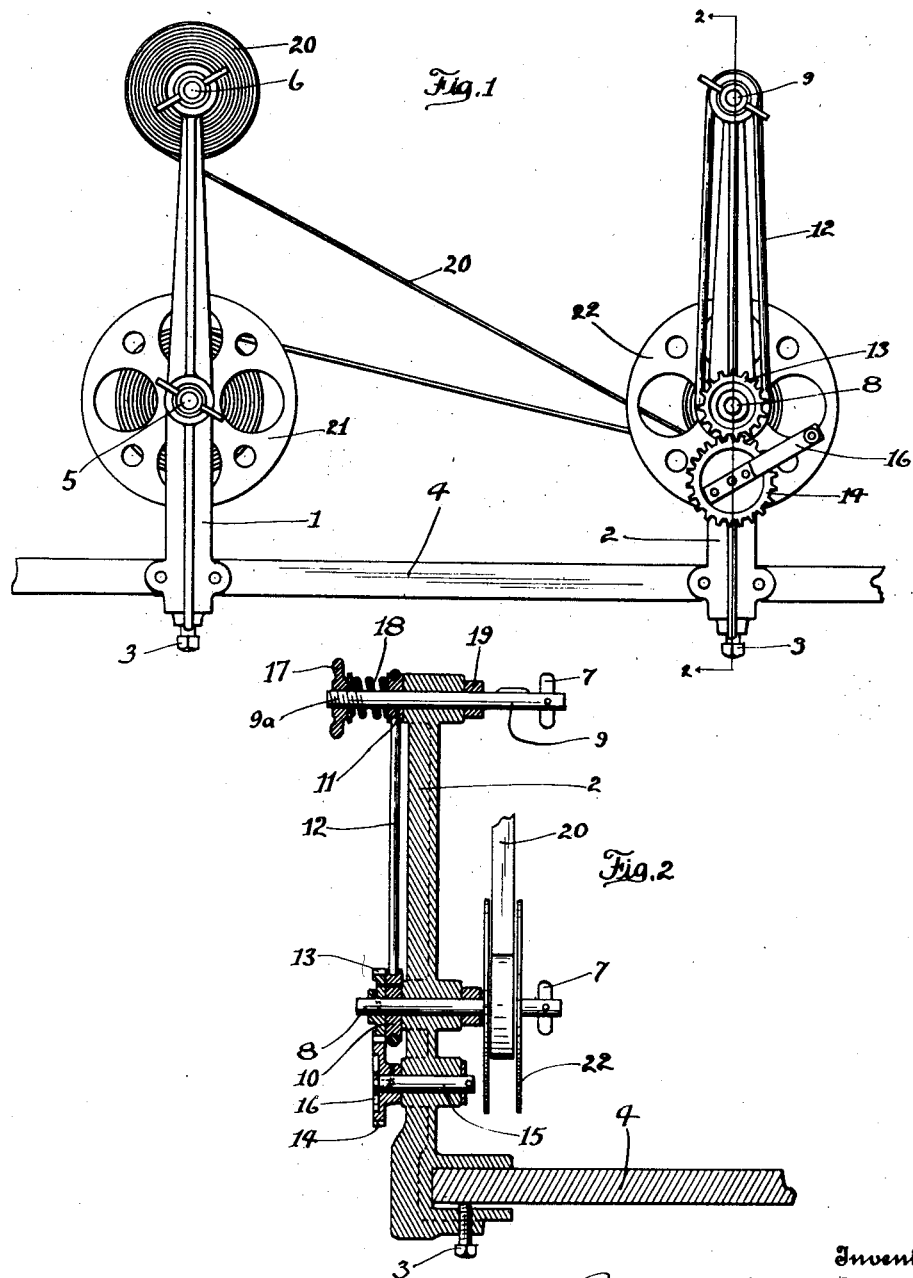

RICHARD D. HANISH, OF COLUMBUS, OHIO.

METHOD FOR TREATING MOVING-PICTURE FILMS.

1,356,356.    Specification of Letters Patent.    Patented Oct. 19, 1920.

Application filed October 29, 1915. Serial No. 58,734.

*To all whom it may concern:*

Be it known that I, RICHARD D. HANISH, a citizen of the United States, residing at Columbus, in the county of Franklin and State of Ohio, have invented certain new and useful Improvements in Methods of Treating Moving-Picture Films, of which the following is a specification.

This invention relates to a method for treating motion picture films to restore them to, and preserve them in, proper working condition. A motion picture film consists of a strip of celluloid to which a coating or emulsion of gelatin, and sensitizing chemicals has been applied; glycerin is usually added to the coating before it is applied to the film to prevent the warping thereof, which the gelatin would otherwise cause as it dries, and to keep the gelatin flexible so it will not check or crack as the film is wound on and unwound from the reel. Both the gelatin and the glycerin are hygroscopic, that is, they absorb moisture from damp air and give off moisture to dry air. Various disadvantages result from this characteristic of the coating. Among others is the tendency not to dry thoroughly under certain atmospheric conditions and to dry too hard under other conditions; and to "sweat," or exude an oily substance which collects on the coated surface. When insufficiently dried the coating becomes viscous or adhesive when subjected to the heat of the lantern. When dried too hard it will crack or check as it is wound on or unwound off the reel. A moist or adhesive surface will collect dust or dirt which not only detracts from the clearness and transparency of the film but has an injurious effect on the film as it is wound and unwound. An adhesive coating will collect in small quantities on the tension spring and other contacting parts of the projecting machine where it is baked hard and causes a scratching or tearing of the film. Oil or sweat on the film produces in the picture blotches or cloudy effects. These disadvantages not only detract from the clearness of the picture as it is thrown on the screen but they seriously interfere with the operation of the projecting machine, and materially shorten the life of the film. The object of the present invention is to overcome these disadvantages by so treating the film as to impart to it a high degree of flexibility and transparency and to provide it with a thoroughly dry surface which will not sweat or be rendered adhesive by the heat of the lantern.

The desired result may be accomplished by applying to the film, in any suitable manner, an oily substance, preferably a liquid. The manner of applying this substance to the film is not material to the present invention and forms no part thereof. It may be applied as part of a renovating process, or by an independent operation. In any event the oily substance permeates the coating of the film and a thin layer thereof remains on the coated surface of the film. The surface of the film is dried and any surplus oil removed by winding the film with absorbent material, preferably a strip of paper, interleaved between the windings thereof. The film is allowed to remain in contact with the absorbent material for a period of time sufficient to dry the same, which will vary under different conditions, and the film is then rewound and the absorbent material removed. This treatment imparts to the film a dry polished surface without in any way interfering with the flexibility or transparency imparted to the film, by the oily substance, as the oil remaining in and on the film overcomes the hygroscopic qualities of the coating, and also lubricates the surface of the film which prevents injury thereto in the winding and rewinding thereof. This method of drying the film also avoids the injury to the film which results from abrasive friction and scratching from dust particles when the oil is removed by rubbing.

The film may be wound with the absorbent material in various ways and in the accompanying drawings I have illustrated one apparatus by which this may be accomplished, and in these drawings:

Figure 1 is a side elevation showing the manner in which the absorbent strip and the film are wound together, and Fig. 2 is a section taken on line 2—2 of Fig. 1.

In these views, the apparatus is shown as comprising a pair of supporting standards 1 and 2, suitably mounted as by means of the clamping screw 3 upon a supporting table 4. Each of these standards is of a considerable height and the standard designated 1 is provided with a pair of spindles 5 and 6, both of these spindles being rotatably journaled in the supporting standards and carrying a pivoted key 7 at their outer ends. These spindles are of a size to fit the standard picture film reel now on the market and after this film has been mounted thereon, the keys are turned to the position shown in Fig. 2 to prevent the accidental removal of the reel. The other supporting standard 2 is also provided with a pair of spindles 8 and 9 also rotatably journaled in the supporting standards and provided at their outer ends with the pivoted keys 7. The opposite ends of each of these spindles is also provided with a pulley designated 10 and 11 respectively. These pulleys, together with the driving belt 12 serve as the drive connection between the spindles 8 and 9. The spindle 8 is further provided with a spur gear shown at 13, which latter gear meshes with a second gear 14 suitably mounted upon a stub shaft 15. This gear 14 also carries a crank arm such as is shown as 16, whereby the two spindles 8 and 9 may be rotated. It will be noted that the pulley 10 is somewhat larger than the pulley 9 and consequently the spindle 9 will revolve at a higher rate of speed than the spindle 8. However, as will presently appear, the ratio between speeds of these spindles cannot accurately be determined and, therefore, it is essential that some compensating means are provided in the drive connection between these two spindles. This compensating structure takes the form of the driving belt 12, together with the braking means carried by one end of the spindle 9, whereby the belt 12 is permitted to slip to a certain degree and in this manner change the rate of rotation of the upper spindle. This braking means takes the form of an adjustable nut 17 mounted on the threaded end 9ª of the spindle 9 and bearing against the compression spring 18. By tightening this nut 16, the compression spring serves to pull the spindle 9 toward the left as shown in Fig. 2 and by this means the collar shown at 19 is moved into greater frictional engagement with the hub of the supporting standard thereby retarding the free rotation of this spindle. This retardation is then accompanied by a slight slippage of the belt 12 over the pulley 11, as has been related. The two spindles 5 and 6 on the other standard are also provided with the braking means described in connection with the spindle 9.

The manner of operation is as follows: The supporting standard 1 is provided with a roll of absorbent material such as tissue paper or the like, as is shown at 20, while the film reel is mounted on the spindle 5 and is designated 21. The film thereon has been previously treated with fluid as outlined in the fore part of the specification and it and the sheet of paper are then led to a second reel 22 mounted on the spindle 8 of the supporting standard 2 and the crank arm 16 rotated in the required direction to cause a winding of the film and the paper onto the reel 22. After this has been done, the newly wound reel and paper is laid away for a considerable length of time, during which time whatever excess of fluid there may be or whatever excess of moisture which may have been taken up by the old film in a moist climate, is taken up by the interposed layers of paper and all exudations from the pores of the emulsion are also taken up. After the film has been allowed to remain idle in this condition for the required time, it is mounted on either of the spindles 5 or 6 of the supporting standard 1 and the paper reel is mounted on the spindle 9 of the supporting standard 2. The original reel or the reel 21 from which the film was originally taken, is then placed on the spindle 8 and the crank again operated. The paper is run onto the reel 20 now mounted on the spindle 9 and all excess liquid of whatever nature is thereby removed, as well as all softened and collected dirt, etc., and the film itself again wound onto its original reel 21. Because of the difference in thickness between the paper and the film, one will unwind at a slightly faster rate than the other and it is because of this difference in linear speed that the braking means on the spindle 9 is provided to cause the slight slippage of the belt. Should one of the strips unwind a little faster than the other, the adjusting nut 16 may be regulated to give the required amount of tension to the spring 18 to cause a uniform winding. These tensioning means are also provided on the supporting standard 1 to prevent too free rotation of these spindles during the operation of winding the film and paper together.

From the foregoing, it must be apparent to those knowing the characteristics of moving picture films, that I have provided a mechanism or method for overcoming the objectionable features of showing blurs and spots on the projecting screen. Not only is the film placed in condition to avoid the appearance of moisture collection, but also all dust and dirt is removed therefrom. In addition to this, the film is insured of the correct pliability and in this way its life is considerably increased.

What I claim is:

1. A method of treating a moving picture film consisting in subjecting the film to the action of an oily fluid and then drying the film by causing it to remain in stationary contact with a strip of absorbent material.

2. A method of treating a motion picture film, consisting in first treating the film with a fluid, then removing the excess fluid by winding the film with a layer of absorbent material inserted between the successive windings thereof, and then rewinding the film without the absorbent material.

3. A method of treating a motion picture film consisting in first subjecting the film to the action of an oily substance and then removing the excess of said substance by winding the film with a strip of absorbent material interleaved between windings thereof, subsequently rewinding the film without the absorbent material.

4. A method of treating moving picture films consisting in subjecting the film to the action of a fluid, then winding the film with a strip of paper and subsequently removing the paper.

5. A method of treating a moving picture film, to which an oily substance has been applied, consisting in winding said film with a strip of absorbent material interposed between the windings thereof to remove the excess oil, and subsequently removing said absorbent material.

6. The process of removing oily substances from a moving picture film consisting in winding said film with an absorbent material interposed between the windings thereof and subsequently removing said absorbent material.

In testimony whereof I affix my signature in presence of two witnesses.

RICHARD D. HANISH.

Witnesses:
WALTER E. L. BOCK,
A. L. PHELPS.